United States Patent
Tages

(10) Patent No.: US 9,264,089 B2
(45) Date of Patent: Feb. 16, 2016

(54) WATERPROOF MOBILE DEVICE CASE

(71) Applicant: A.G. Findings & Mfg. Co., Sunrise, FL (US)

(72) Inventor: Fernando Tages, Coral Springs, FL (US)

(73) Assignee: A.G. Findings & Mfg. Co., Sunrise, FL (US)

( * ) Notice: Subject to any disclaimer, the term of this patent is extended or adjusted under 35 U.S.C. 154(b) by 0 days.

(21) Appl. No.: 14/211,182

(22) Filed: Mar. 14, 2014

(65) Prior Publication Data

US 2014/0274232 A1    Sep. 18, 2014

Related U.S. Application Data

(60) Provisional application No. 61/794,760, filed on Mar. 15, 2013.

(51) Int. Cl.
| | |
|---|---|
| *H04M 1/00* | (2006.01) |
| *H04B 1/3888* | (2015.01) |
| *H04M 1/18* | (2006.01) |

(52) U.S. Cl.
CPC ............. *H04B 1/3888* (2013.01); *H04M 1/185* (2013.01)

(58) Field of Classification Search
USPC ............. 455/550.1, 556.1, 556.2, 557, 575.1, 455/575.8
See application file for complete search history.

(56) References Cited

U.S. PATENT DOCUMENTS

| | | |
|---|---|---|
| 6,646,864 B2 | 11/2003 | Richardson |
| 6,995,976 B2 | 2/2006 | Richardson |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,312,984 B2 | 12/2007 | Richardson et al. |
| 7,609,512 B2 | 10/2009 | Richardson et al. |
| D615,535 S | 5/2010 | Richardson et al. |
| 7,907,394 B2 | 3/2011 | Richardson et al. |
| D670,280 S | 11/2012 | Rayner |
| D675,161 S | 1/2013 | Rayner |
| 8,342,325 B2 | 1/2013 | Rayner |

(Continued)

FOREIGN PATENT DOCUMENTS

EP    2381332 A2    10/2011

OTHER PUBLICATIONS

Written Opinion of the International Preliminary Examining Authority dated Mar. 2, 2015 for International Application No. PCT/US2014/028449, International Filing Date Mar. 14, 2014 (5-pages).

(Continued)

*Primary Examiner* — Fayyaz Alam
(74) *Attorney, Agent, or Firm* — Christopher & Weisberg, P.A.

(57) ABSTRACT

A case for a mobile communication device includes a base that defines an interior and a first surface and is configured to receive at least a portion of the mobile communication device in the interior. A screen protector is configured to releasably engage the base and defines a first surface of the screen protector. The screen protector is configured to retain a gasket, which is releasably engageable to the screen protector, between the first surface of the base and the first surface of the screen protector. A cover is provided that is releasably engageable with the base and is configured to releasably restrain the screen protector when engaged with the base. The cover defines an opening through which at least a portion of the screen protector is accessible.

19 Claims, 15 Drawing Sheets

(56) References Cited

U.S. PATENT DOCUMENTS

| | | | |
|---|---|---|---|
| 8,393,466 B2 | 3/2013 | Rayner | |
| D685,327 S | 7/2013 | Rayner | |
| 8,526,180 B2 | 9/2013 | Rayner | |
| 8,531,824 B2 | 9/2013 | Rayner | |
| 8,531,834 B2 | 9/2013 | Rayner | |
| D691,990 S | 10/2013 | Rayner | |
| D692,419 S | 10/2013 | Rayner | |
| 8,548,541 B2 | 10/2013 | Rayner | |
| 8,564,950 B2 | 10/2013 | Rayner | |
| 8,570,737 B2 | 10/2013 | Rayner | |
| D693,801 S | 11/2013 | Rayner | |
| D694,227 S | 11/2013 | Rayner | |
| D702,637 S | 4/2014 | Rayner | |
| 8,708,142 B2 | 4/2014 | Rayner | |
| 2005/0030707 A1* | 2/2005 | Richardson et al. | 361/681 |
| 2005/0174727 A1* | 8/2005 | Thomas et al. | 361/681 |
| 2006/0061950 A1* | 3/2006 | Richardson et al. | 361/683 |
| 2009/0009945 A1* | 1/2009 | Johnson et al. | 361/681 |
| 2010/0008028 A1 | 1/2010 | Richardson et al. | |
| 2011/0226545 A1 | 9/2011 | Richardson et al. | |
| 2011/0228458 A1 | 9/2011 | Richardson et al. | |
| 2011/0228459 A1 | 9/2011 | Richardson et al. | |
| 2012/0118773 A1 | 5/2012 | Rayner | |
| 2012/0211382 A1* | 8/2012 | Rayner | 206/320 |
| 2012/0314354 A1 | 12/2012 | Rayner | |
| 2013/0027862 A1 | 1/2013 | Rayner | |
| 2013/0063004 A1* | 3/2013 | Lai et al. | 312/223.1 |
| 2013/0077226 A1 | 3/2013 | Rayner | |
| 2013/0088130 A1 | 4/2013 | Rayner | |
| 2013/0088828 A1 | 4/2013 | Rayner | |
| 2013/0092576 A1 | 4/2013 | Rayner | |
| 2013/0188312 A1 | 7/2013 | Rayner | |
| 2013/0271902 A1* | 10/2013 | Lai et al. | 361/679.01 |
| 2013/0334072 A1 | 12/2013 | Rayner | |
| 2014/0016217 A1 | 1/2014 | Rayner | |
| 2014/0027317 A1 | 1/2014 | Rayner | |
| 2014/0029782 A1 | 1/2014 | Rayner | |
| 2014/0031703 A1 | 1/2014 | Rayner et al. | |
| 2014/0049060 A1 | 2/2014 | Rayner | |
| 2014/0152890 A1 | 6/2014 | Rayner | |
| 2014/0217863 A1* | 8/2014 | Rayner | 312/223.1 |
| 2015/0090748 A1* | 4/2015 | Rayner | 224/191 |

OTHER PUBLICATIONS

International Search Report and Written Opinion dated Jun. 25, 2014 for International Application No. PCT/US2014/028449, International Filing Date Mar. 14, 2014 consisting of 8 pages.

PCT Notification Concerning Transmittal of International Preliminary Report on Patentability Form/PCT/IB/326, for corresponding International Application No. PCT/US2014/028449; International Filing Date: Mar. 14, 2014 consisting of 20-pages.

* cited by examiner

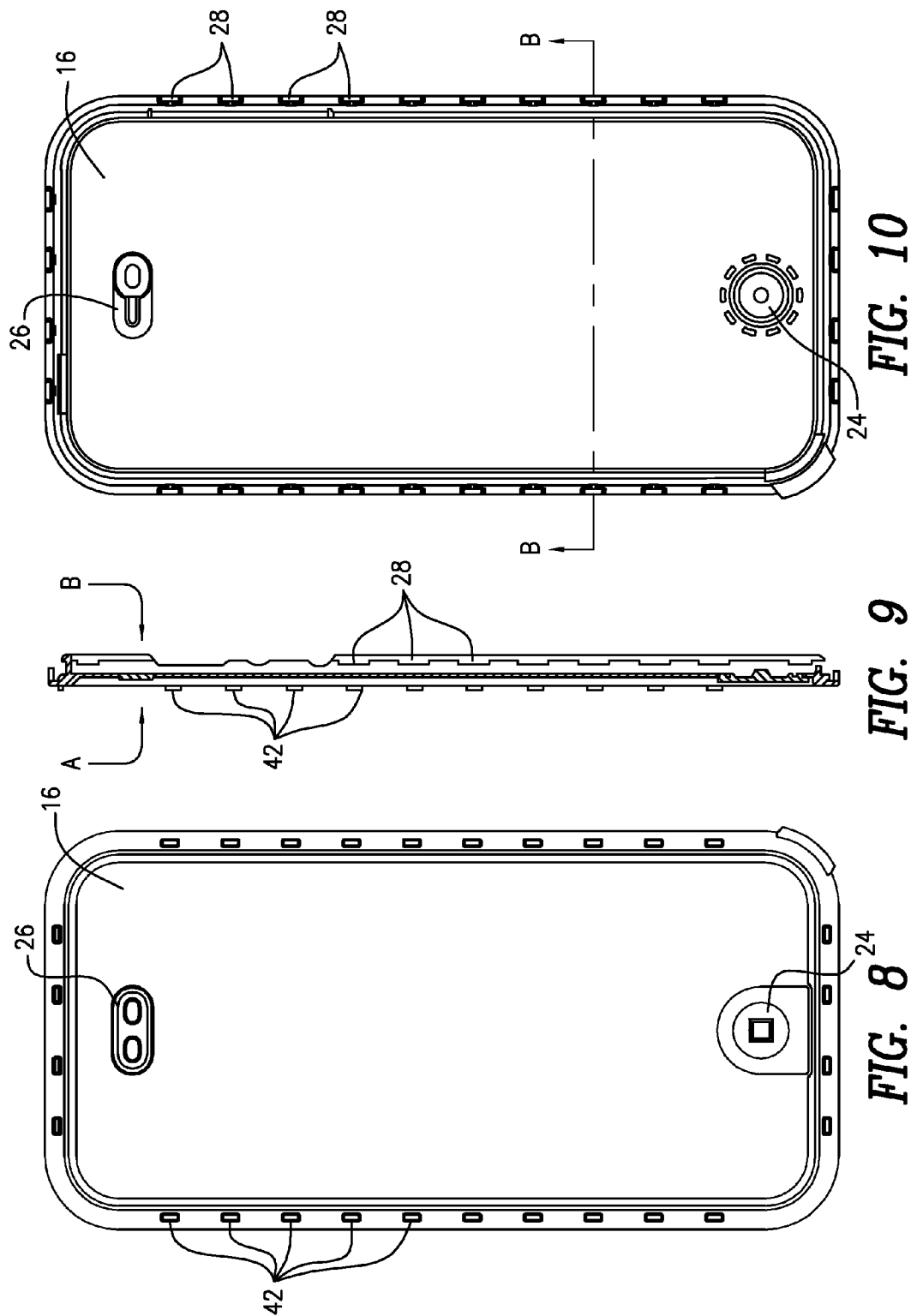

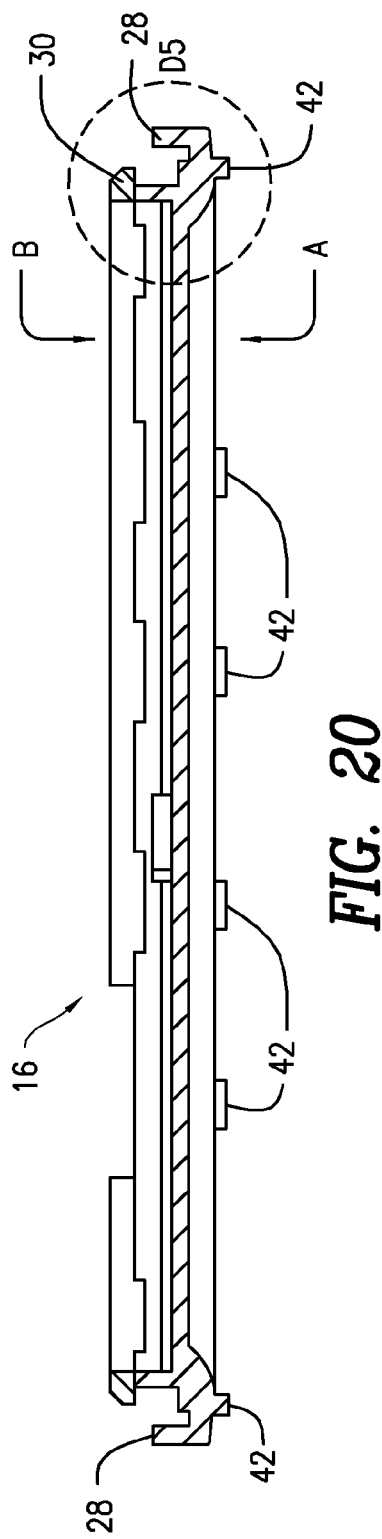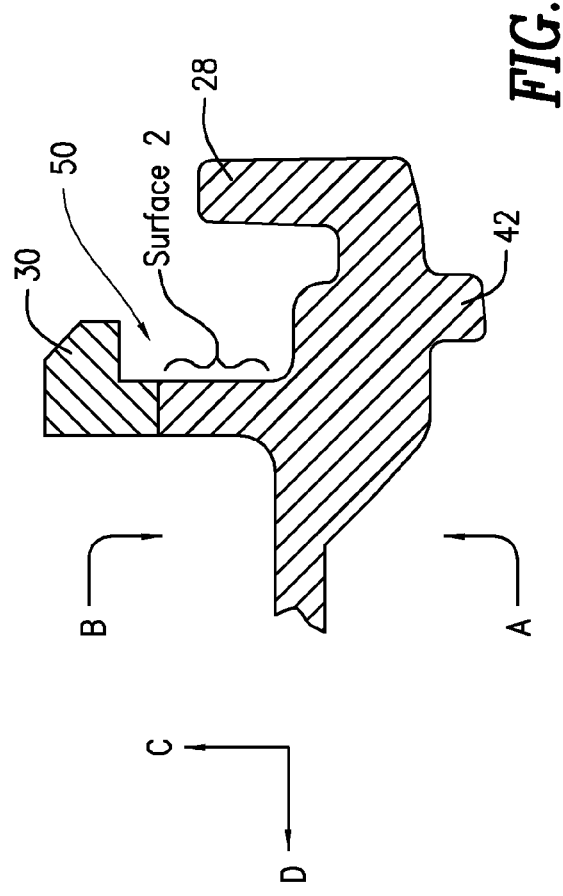

WATERPROOF MOBILE DEVICE CASE

CROSS REFERENCE TO RELATED APPLICATIONS

This application claims priority to U.S. Provisional Application 61/794,760, filed Mar. 15, 2013, which is incorporated herein by reference in its entirety.

FIELD OF THE INVENTION

The present invention relates to protective mobile electronic device cases, and in particular, a waterproof protective mobile device case.

BACKGROUND OF THE INVENTION

Waterproof mobile device cases on the market today for smartphones, or other portable electronic devices, are often large, cumbersome and unwieldy owing to multiple difficult to use latches and multiple plugs that need to be inserted into the case to ensure that the case is watertight. Additionally, current waterproof cases afford little or no drop protection. Still further, current waterproof cases do not maintain a waterproof integrity when the case is dropped due to excessive dynamic deformation that affects the integrity of the waterproof seals and thresholds.

SUMMARY OF THE INVENTION

The present invention advantageously provides a protective and waterproof mobile device case as substantially depicted and described herein. In accordance with one embodiment of the present invention, a case for a mobile communication device includes a base defining an interior. The base defines a first surface and is configured to receive at least a portion of the mobile communication device in the interior. The case includes a screen protector configured to releasably engage the base. The screen protector defines a first surface of the screen protector. The case includes a gasket that is releasably engageable to the screen protector. The screen protector is configured to retain the gasket between the first surface of the base and the first surface of the screen protector. The case includes a cover that is releasably engageable with the base and is configured to releasably restrain the screen protector when engaged with the base. The cover defines an opening through which at least a portion of the screen protector is accessible.

In accordance with another embodiment of the present invention, a case for a mobile communication device includes a base that defines an interior and a first surface. The base is configured to receive a portion of the mobile communication device in the interior, and includes sidewalls that define a perimeter of the base. The base includes a number of first mating elements disposed on the perimeter of the base. The case includes a screen protector configured to releasably engage the base. The screen protector defines a first surface and includes a number of second mating elements. At least one of the number of second mating elements is configured to connect to a corresponding at least one of the number of first mating elements. The case includes a gasket that is releasably engageable to the screen protector. The screen protector is configured to retain the gasket between the first surface of the base and the first surface of the screen protector. The case includes a cover that is releasably engageable with the base and is configured to releasably restrain the screen protector when engaged with the base. The cover defines an opening through which at least a portion of the screen protector is accessible.

In accordance with another embodiment of the present invention, a case for a mobile communication device includes a base that defines an interior and is configured to receive at least a portion of the mobile communication device in the interior. The base includes sidewalls defining a perimeter of the base and a first surface of the base. The perimeter has an outside portion. The base includes a number of first mating elements disposed on the outside portion of the perimeter of the base, and each of the number of first mating elements includes a slotted opening configured to extend a first distance into a side of the side of the base. The case further includes a screen protector configured to releasably engage the base. The screen protector defines a first surface of the screen protector and includes a number of second mating elements. At least one of the number of second mating elements is configured to connect to a corresponding at least one of the number of first mating elements over a distance. Each of the number of second mating elements includes a protuberance extending a second distance from a side of the screen protector. The screen protector includes a rib disposed on the first surface. The rib defining at least a portion of a perimeter of the screen protector. The case includes a gasket that is releasably engageable to the screen protector. The screen protector is configured to retain the gasket between the first surface of the base and the first surface of the screen protector, and the rib of the screen protector is configured to retain the gasket on the perimeter of the screen protector. The case includes a cover that is releasably engageable with the base. The cover is configured to restrain the screen protector in an engaged configuration with the base. The gasket is disposed between at least a portion of an inside surface of the perimeter of the interior and at least a portion of an outside surface of the rib when the screen protector is retained in the engaged configuration with the base. A level of compression of the gasket between the at least the portion of the inside surface of the perimeter of the interior and the at least the portion of the outside surface of the rib is based on the extent of engagement between the at least one of the number of second mating elements and the corresponding at least one of the number of first mating elements.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 is a front view of a screen protector constructed in accordance with the principles of the present invention;

FIG. 9 is a side view of the screen protector shown in FIG. 8;

FIG. 10 is a rear view of the screen protector shown in FIG. 8;

FIG. 20 is a view through section B-B of the screen protector as shown in FIG. 10; and FIG. 21 is a detail view of section D5 in FIG. 20.

DETAILED DESCRIPTION OF THE INVENTION

As used herein, relational terms, such as "first" and "second," "top" and "bottom," "front" and "rear," and the like, may be used solely to distinguish one entity or element from another entity or element without necessarily requiring or implying any physical or logical relationship or order between such entities or elements.

Figure 1:
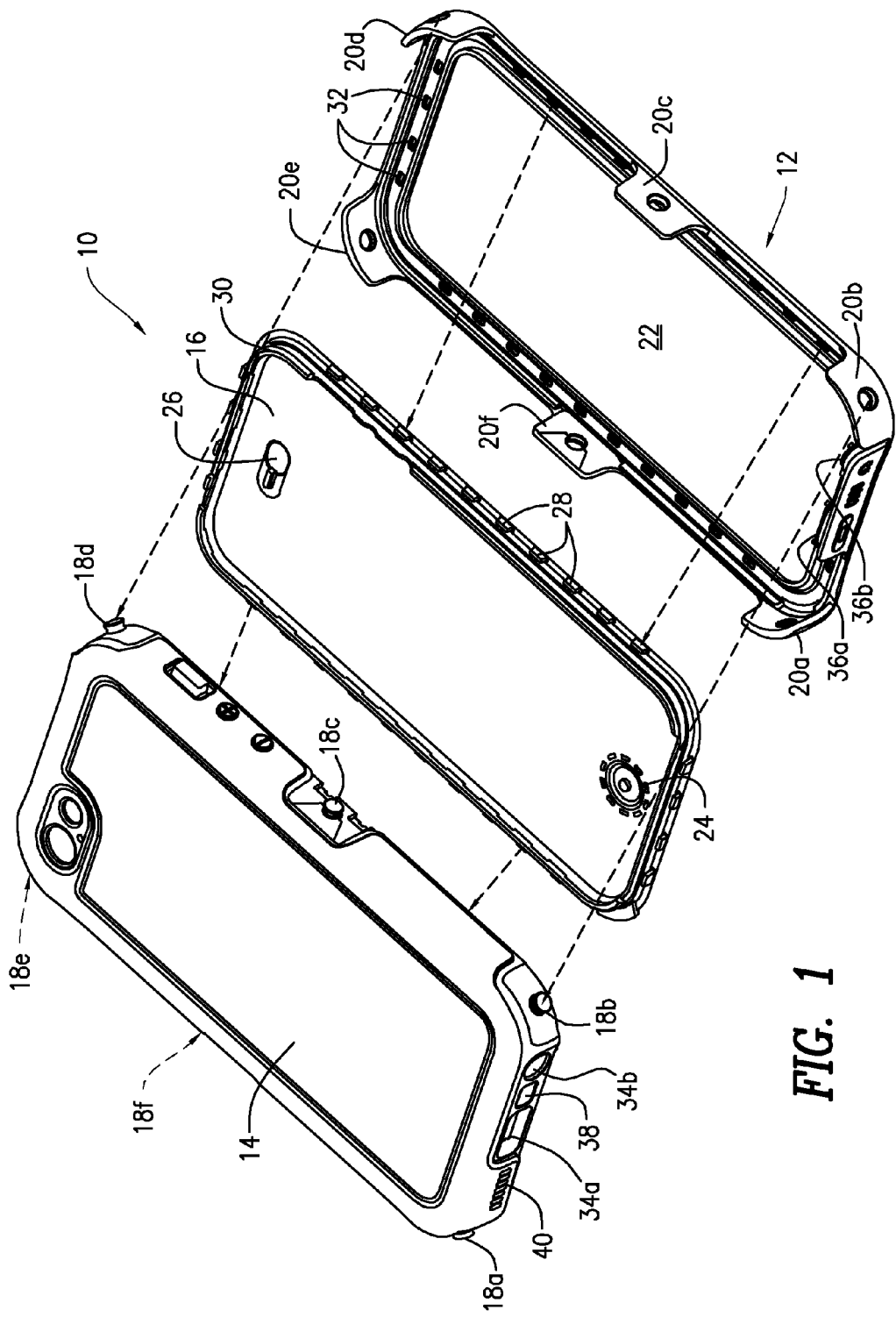
FIG. 1 is an exploded rear perspective view of the base, the screen protector and the cover of the waterproof mobile device case constructed in accordance with the principles of the present invention.

Now referring to the drawings in which like reference designators refer to like elements, there is shown, in FIG. 1, a waterproof mobile electronic device case 10 constructed in accordance with the principles of the present invention. The case 10 is sized to receive and releasably retain a mobile electronic device such as a smartphone, a tablet computer, and the like. The case 10 includes a cover 12 that is releasably engageable to a base 14 to retain the mobile electronic device within the case 10 in an interior defined by the base 14. The screen protector 16 is releasably engageable and sealable against the base 14. In addition, the screen protector 16 is releasably engageable and sealable against the mobile electronic device when the mobile electronic device is disposed within the base 14.

The base 14 includes a plurality of first securing elements 18a, 18b, 18c, 18d, 18e and 18f, collectively referred to as first securing elements 18, which operate to releasably attach the base 14 to the cover 12. The cover 12 includes a plurality of second securing elements 20a, 20b, 20c, 20d, 20e, and 20f, collectively referred to as second securing elements 20, which releasably attach to the latches 18. According to some exemplary embodiments, the second securing elements 20 releasably attach to the first securing elements 18 by an interference fit or a friction fit, for example. Although six first securing elements 18 and six second securing elements 20 are shown, the invention is not limited to six of each element. It is contemplated that more than six or fewer than six first securing elements 18 and second securing elements 20 pairs can be used depending on factors such as desired strength and size of the device case 10.

The cover 14 defines an opening 22 through which an operator may access the screen protector 16. The screen protector 16 may be a flexible or rigid water proof structure disposed between the base 14 and the cover 12. The screen protector 16 is transparent or substantially translucent, allowing transmission of a visual display of the mobile electronic device when retained within the case 10. The screen protector 16 is configured to permit user control of a touch-sensitive display of the mobile electronic device, which may include, for example, a resistive or capacitive touch-sensitive display.

In some embodiments, the screen protector 16 includes a button control 24 that provides a water tight seal between a front side and a back side of the screen protector 16. The button control 24 may be sufficiently flexible to allow user manipulation of a control of the mobile electronic device from the front side to the back side of the screen protector 16 when retained in the case 10. The control of the mobile electronic device may include, for example, a push button, which may be depressed by a user, or a toggle switch, which may be switched by the user, and a joystick or pointer control, which may be manipulated by a user. The button control 24 may be opaque or substantially translucent to allow transmission of light there through. In some embodiments, the button control 24 can be eliminated where the mobile electronic device has no buttons on the front thereof.

The screen protector 16 includes an ear piece 26, which may be a water proof membrane that provides a water tight seal between the front side and the back side of the screen protector 16, while providing acoustic transmission between the front side and the back side. According to some exemplary embodiments, the ear piece 26 may allow sound from an ear piece of the mobile electronic device to transmit through the screen protector 16 to a user when the mobile electronic device is retained in the case 10.

The screen protector 16 defines a perimeter of the screen protector 16 that includes a plurality of mating elements 28. Each of the plurality of mating elements 28 may be a protuberance that extends a distance from the screen protector 16, for example, toward the base 14. According to some exemplary embodiments, each of the plurality of mating elements may be a substantially rectangular protuberance having a tapered configuration.

The perimeter of the screen protector 16 includes a rib 30. The rib 30 may be rigid or resiliently deformable. According to some exemplary embodiments, the rib 30 may be configured to space the mobile electronic device from the sidewalls of the base 14 to provide impact protection to the mobile electronic device when the mobile electronic device is retained in the case 10.

The cover 12 defines a perimeter of the cover 12 that defines a plurality of notches 32 along the perimeter. Each of the plurality of notches 32 may be a slot or depression that extends for a distance into the cover 14.

The base 14 defines a plurality of ports 34a and 34b, collectively referred to as ports 34. The ports 34 define an opening through which an operator may access accessory ports of the mobile electronic device when the mobile electronic device is retained in the case 10. According to some exemplary embodiments, at least one of the ports 34 allow access to an audio jack, e.g., a headphone jack, of the mobile electronic device. According to other exemplary embodiments, at least one of the ports 34 allows access to a power and/or data plug, e.g., a Universal Serial Bus, USB, port, a mini-USB port, a micro-USB port, an Apple™ Lightning port, and the like. The cover 12 includes a plurality of port plugs 36a and 36b, collectively referred to as port plugs 36. The ports 34 are configured to receive a corresponding port plug 36 of the cover 12 when the cover 12 is assembled to the base 14.

The base 14 includes an acoustic port 38 and a speaker port 40. Each of the acoustic port 38 and the speaker port 40 defines a corresponding opening having a corresponding water proof membrane that provides a water tight seal between the interior of the base 14 and an exterior of the base 14. The acoustic port 38 and the speaker port 40 provide acoustic transmission between the interior of the base 14 and the exterior of the base 14. According to some exemplary embodiments, the acoustic port 38 allows sound from the exterior of the base 14 to transmit to a microphone of the mobile electronic device in the interior of the base 14 when the mobile electronic device is retained in the case 10. According to some exemplary embodiments, the speaker port 40 allows sound from a speaker of the mobile device in the interior of the base 14 to transmit to the exterior of the base 14.

The case 10 may be composed of a substantially resilient material, e.g., thermoplastic polyurethane, TPU, molded to a portion of a substantially rigid material, e.g., polycarbonate. Polycarbonate is a thermoplastic polymer that may be molded and thermoformed. TPU is a thermoplastic elastomer that may be resiliently deformable. The base 14 includes a plurality of sidewalls that define a perimeter of the base 14. A portion of the sidewalls may include a layer of resilient material including, for example, TPU molded to an exterior surface of the sidewalls and forming a portion of the interior of the base. The TPU may be molded to the polycarbonate in a single-step or multi-step process by co-molding or overmolding. The base 14 including the sidewalls may be composed of a substantially rigid material including, for example, polycarbonate.

Figure 2:
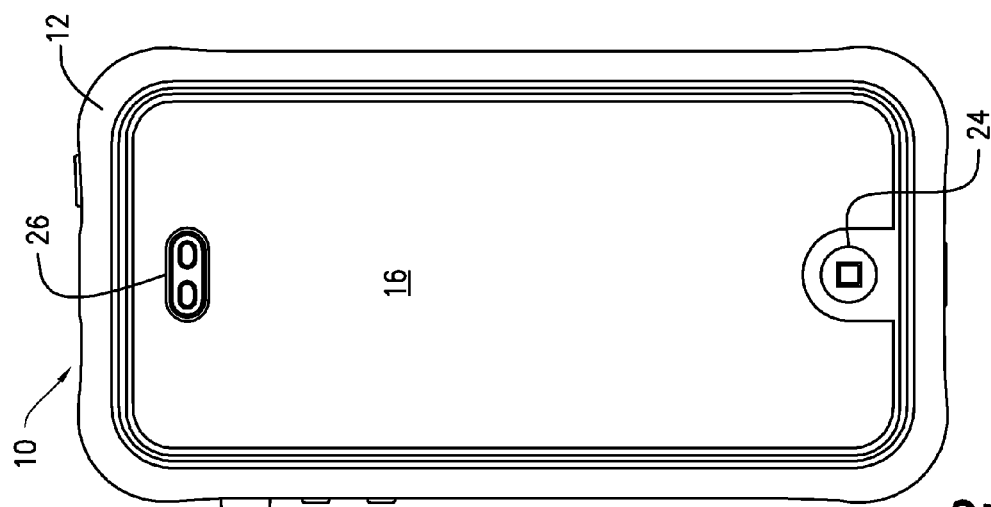
FIG. 2 is a front view of the waterproof mobile device case shown in FIG. 1.

Now referring to FIG. 2, a front view of the case 10 is shown. The cover 12 retains the screen protector against the base 14 (not shown). The front view of the screen protector 16 includes the ear piece 26 and the button control 24.

Figure 3:
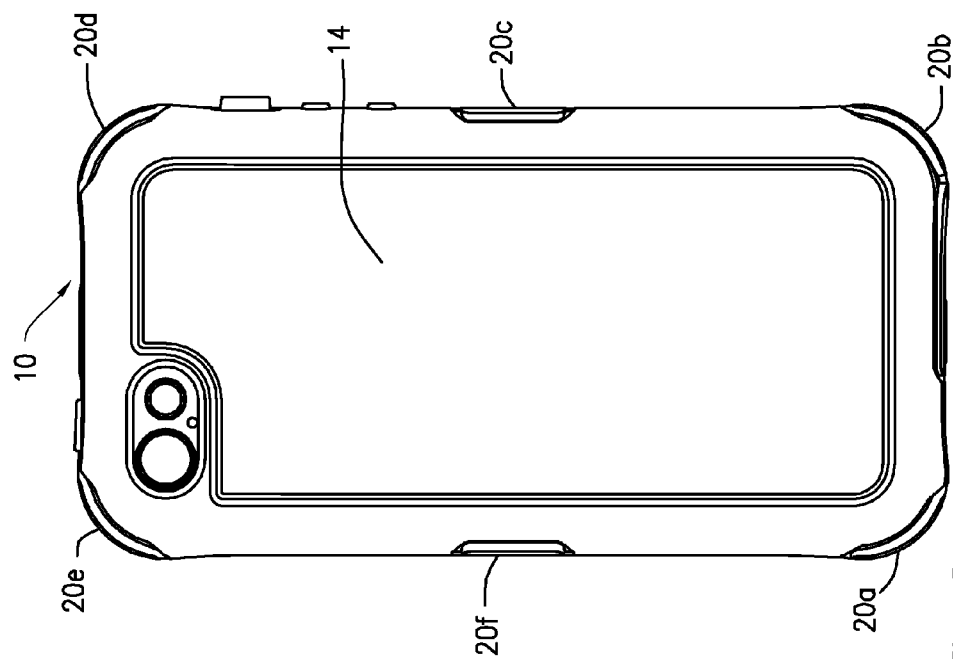
FIG. 3 is a rear view of the waterproof mobile device case shown in FIG. 1.

A rear view of the case 10 is shown in FIG. 3. The second securing elements 20 are shown releasably engaged to the first securing elements 18 (not shown) of the base 14.

Figure 4:
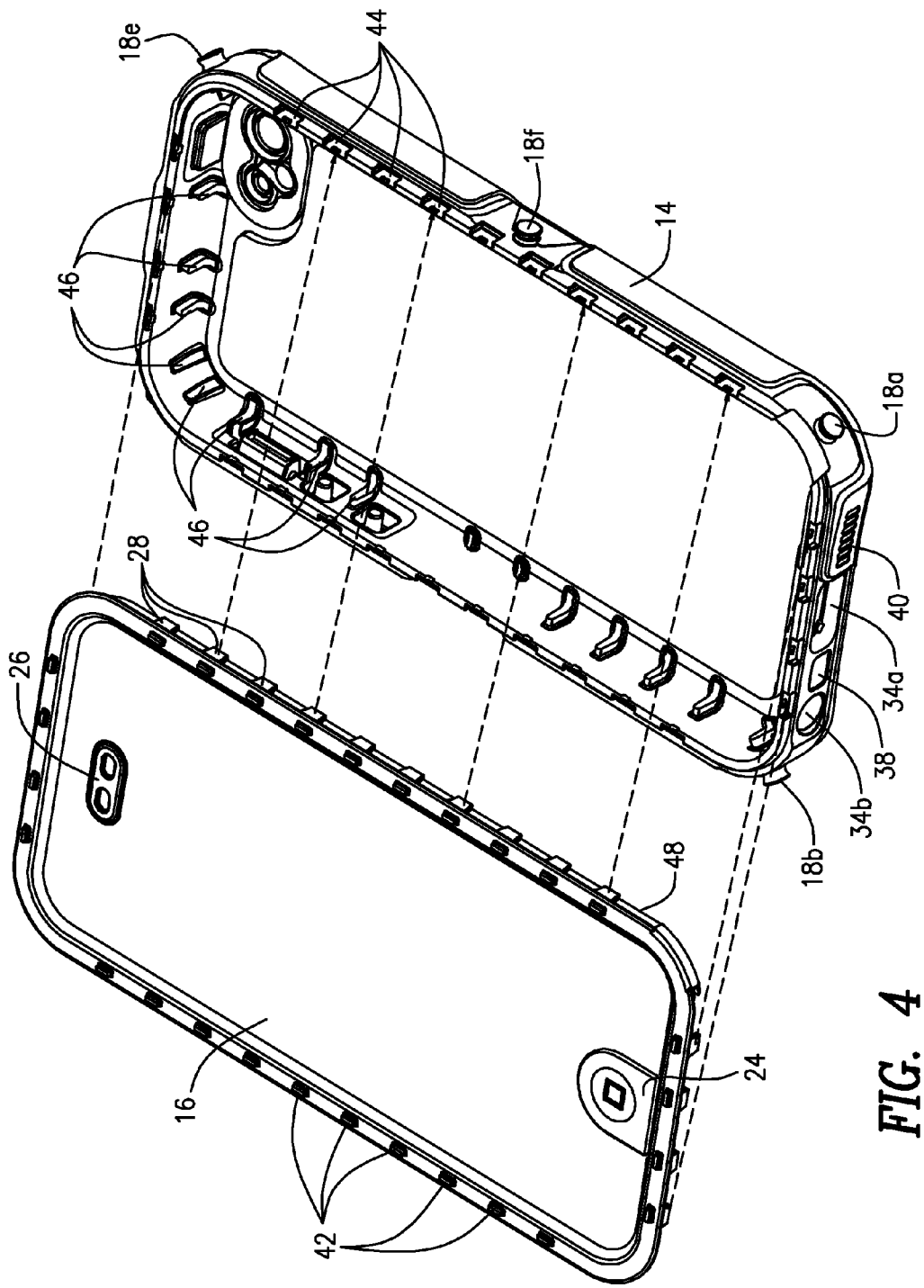
FIG. 4 is an exploded front perspective view of the screen protector and the base of the waterproof mobile device case shown in FIG. 1.

Now referring to FIG. 4, an exploded front perspective view of the screen protector 16 and the base 14 is shown. The screen protector 16 includes a plurality of retaining elements 42 disposed on the perimeter of the screen protector 16 and on a side of the screen protector 16 opposite the mating elements 28. Each of the plurality of retaining elements 42 may be a tab or a protuberance that extends a distance orthogonally away from the screen protector 16. The button control 24 and the ear piece 26 are shown.

The base 14 includes sidewalls that define a plurality of receiving elements 44 disposed around the front perimeter of the base 14. Each of the plurality of receiving elements 44 may be a slot that extends downward into the sidewalls of the base 14 for a distance. Each slot may be substantially rectangular and configured to substantially receive a corresponding one of the plurality of mating elements 28 of the screen protector 16 when the cover 12 is assembled to the base 14 and retains the screen protector 16 therebetween. Thus, when the screen protector 16 is assembled to the base 14, the mating elements 28 and the receiving elements 44 form a male-female coupled pair. It will be appreciated that, although the mating elements 28 and receiving elements 44 are described herein as a male-female coupled pair, such that the mating elements 28 form the "male" portion and the receiving elements 44 form the "female" portion of the pair, modifications to this configuration can be made. In particular, the mating elements 28 may be modified to form the "female" portion and the receiving elements 44 may be modified to form the "male" portion of the coupled pair. Moreover, the mating elements 28 and the receiving elements 44 may be "mating elements" that join the base 14 and the screen protector 16 together.

The base 14 also includes a plurality of tension elements 46 disposed on the interior of the base 14. The plurality of tension elements 46 may be disposed on the sidewalls of the base 14 and/or a planar portion of the base 14. The sidewalls of the base 14 may be substantially perpendicular to the planar portion of the base 14. The plurality of tension elements 46 are configured to space the mobile electronic device from at least one of the planar portion of the base 14 and the sidewalls of the base 14 when the mobile electronic device is retained within the case 10. Each of the plurality of tension elements 46 is flexible and resiliently deformable. In one exemplary embodiment, the tension elements 46 are made of TPU or of silicon. The plurality of tension elements 46 may be disposed on the sidewalls and/or planar portion of the base 12 to provide impact protection to the mobile electronic device when retained within the case 10 by allowing deformation of the sidewalls and planar portion of the base 12 without contacting the mobile electronic device. According to some exemplary embodiments, the each of the first securing elements 18 include a protuberance extending a distance perpendicular from the outer surface of the sidewalls of the base 14.

The screen protector 16 includes a gasket 48, which may be a flexible, impermeable element. The mating elements 28 and the receiving elements 44 provide a clamping force therebetween such that, when assembled, the clamping force compresses the gasket 48 between a surface on the perimeter of the base 14 and a surface on the perimeter of the screen protector 16. According to some exemplary embodiments, the clamping force may vary based on an extent the mating elements 28 are assembled to the receiving elements 44 such that the clamping force increases as the mating elements 28 are further inserted into the receiving elements 44.

Figure 5:
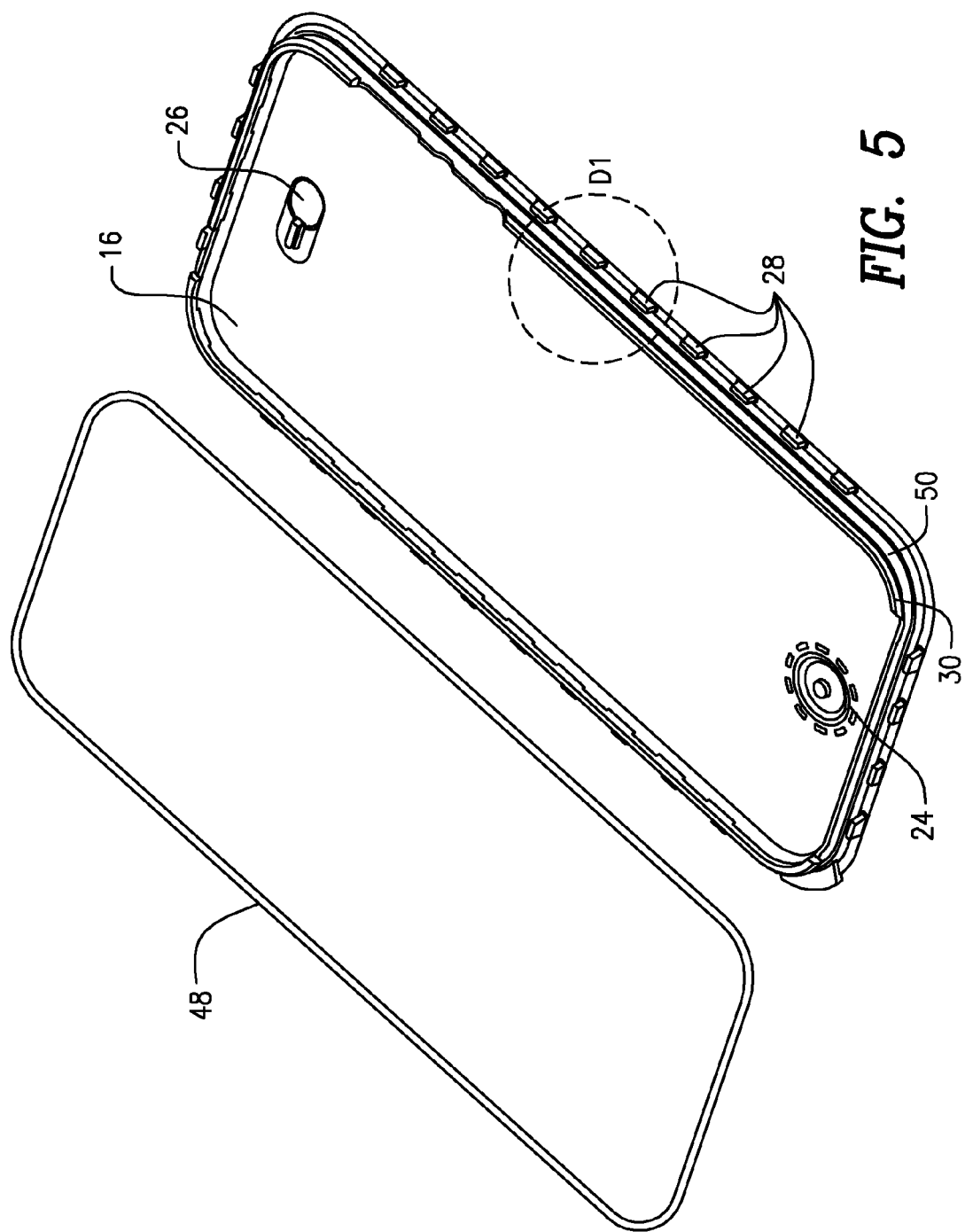
FIG. 5 is an exploded rear perspective view of a gasket and a screen protector in accordance with the principles of the present invention.

Now referring to FIG. 5, an exploded rear perspective view of the screen protector 16 is shown. The gasket 48 may be elastic and configured as a continuous loop. The gasket 48 may be disposed on a perimeter defined by the screen protector 16. The perimeter of the screen protector 16 includes a groove 50 defined by the rib 30 that is configured to retain the gasket 48 therein. According to some exemplary embodiments, the gasket 48 may be retained in the groove 50 at least in part by virtue of an elasticity of the gasket 48. The button control 24, the ear piece 26 and the mating elements 28 are shown.

Figure 6:
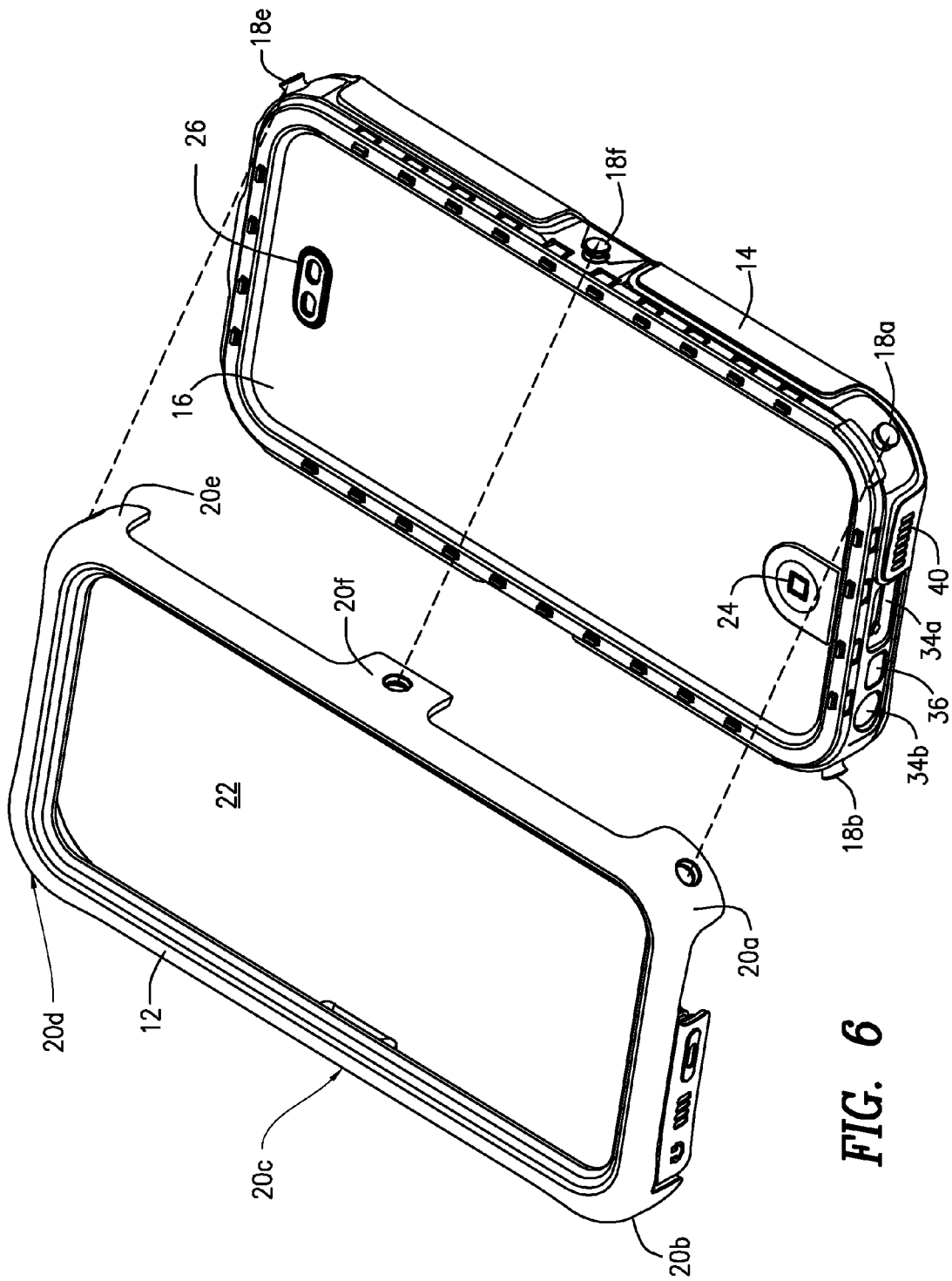
FIG. 6 is an exploded front perspective view of the cover and the screen protector and base assembly of the waterproof mobile device case shown in FIG. 1.

Now referring to FIG. 6, an exploded front perspective view of the cover 12 and the screen protector 16 and base 14 assembly is shown. The gasket 48 (not pictured) is disposed between the screen protector 16 and the base 14 and provides an environmental seal, e.g., a water tight seal, when disposed therebetween. The cover 12 holds the screen protector 16 to the base 14 when second securing elements 20 are mated with the corresponding first securing elements 18.

Figure 7:
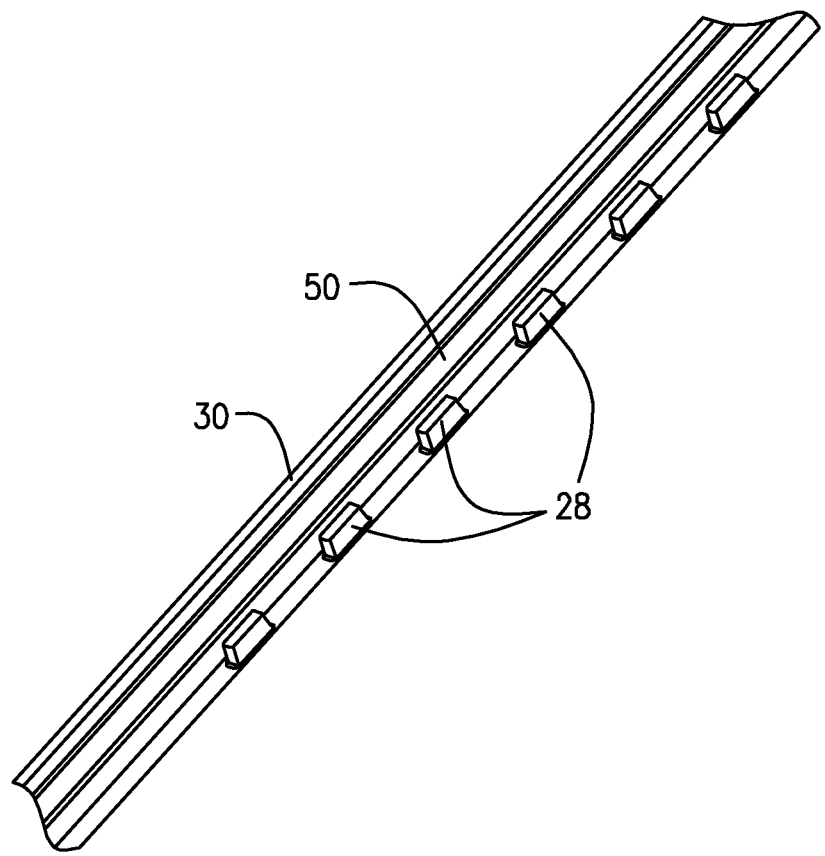
FIG. 7 is a detail view of section D1 of the screen protector shown in FIG. 5.

Now referring to FIG. 7, a detail view of section D1 of the screen protector 16 of FIG. 5 is shown. The mating elements 28, the rib 30 and the groove 50 are shown. According to some exemplary embodiments, the groove 50 is disposed between the mating elements 28 and the rib 30. The rib 30 can extend out over a portion of groove 50.

Now referring to FIGS. 8-10, a front view, a side view and a rear view of the screen protector 16 are shown, respectively. The screen protector 16 includes a front side A and a rear side B. The screen protector 16 includes the retaining elements 42, along the perimeter of the screen protector 16 on the front side A. The mating elements 28 are disposed along the perimeter of the screen protector 16 on the rear side B, opposite the retaining elements 42. According to some exemplary embodiments, each retaining elements 42 on the front side A includes a corresponding mating element 28 on the rear side B. The button control 24 and the ear piece 26 provide a water tight seal between the front side A and the rear side B.

Figure 11:
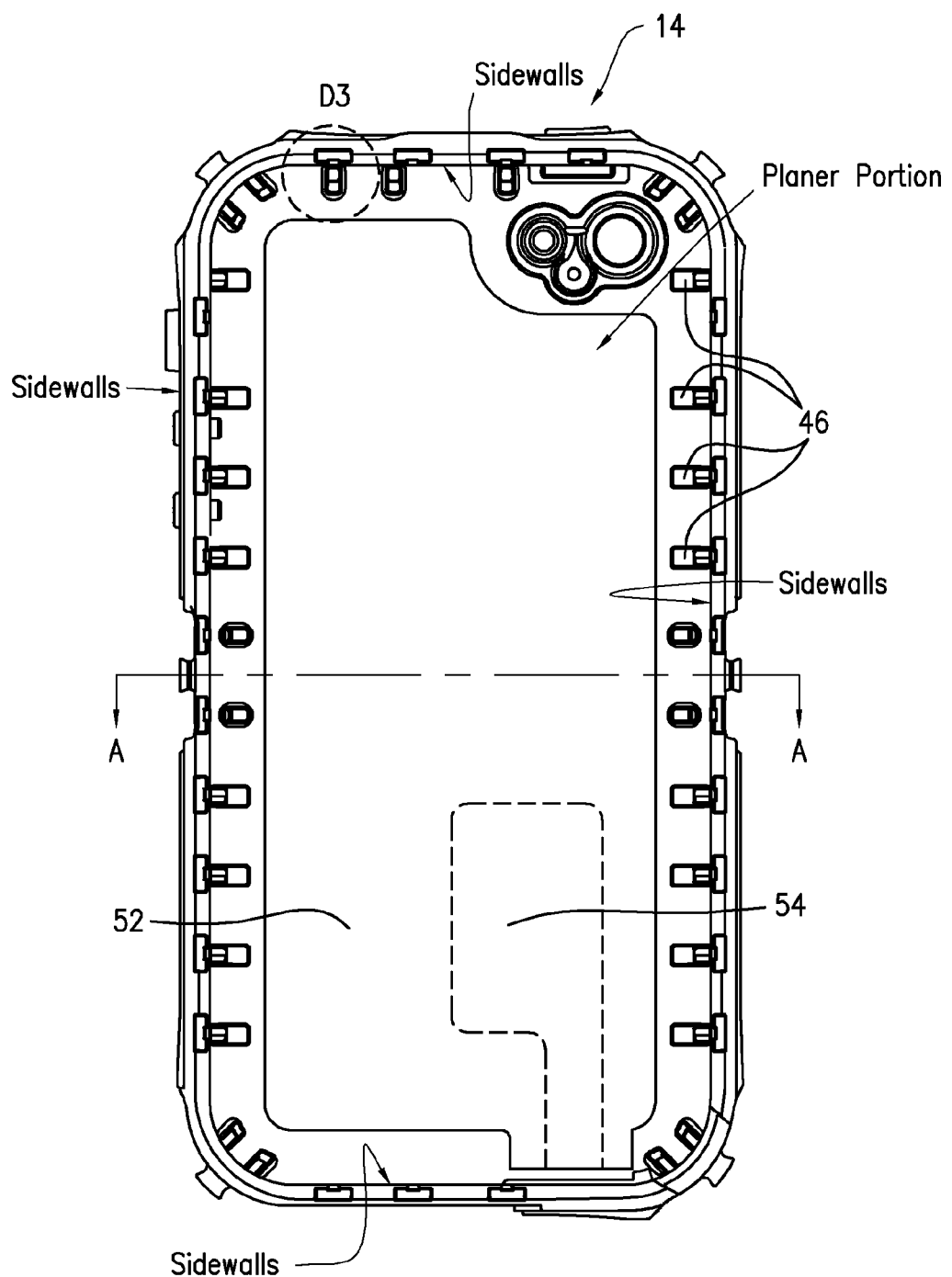
FIG. 11 is a front view of a base constructed in accordance with the principles of the present invention.
Figure 12:
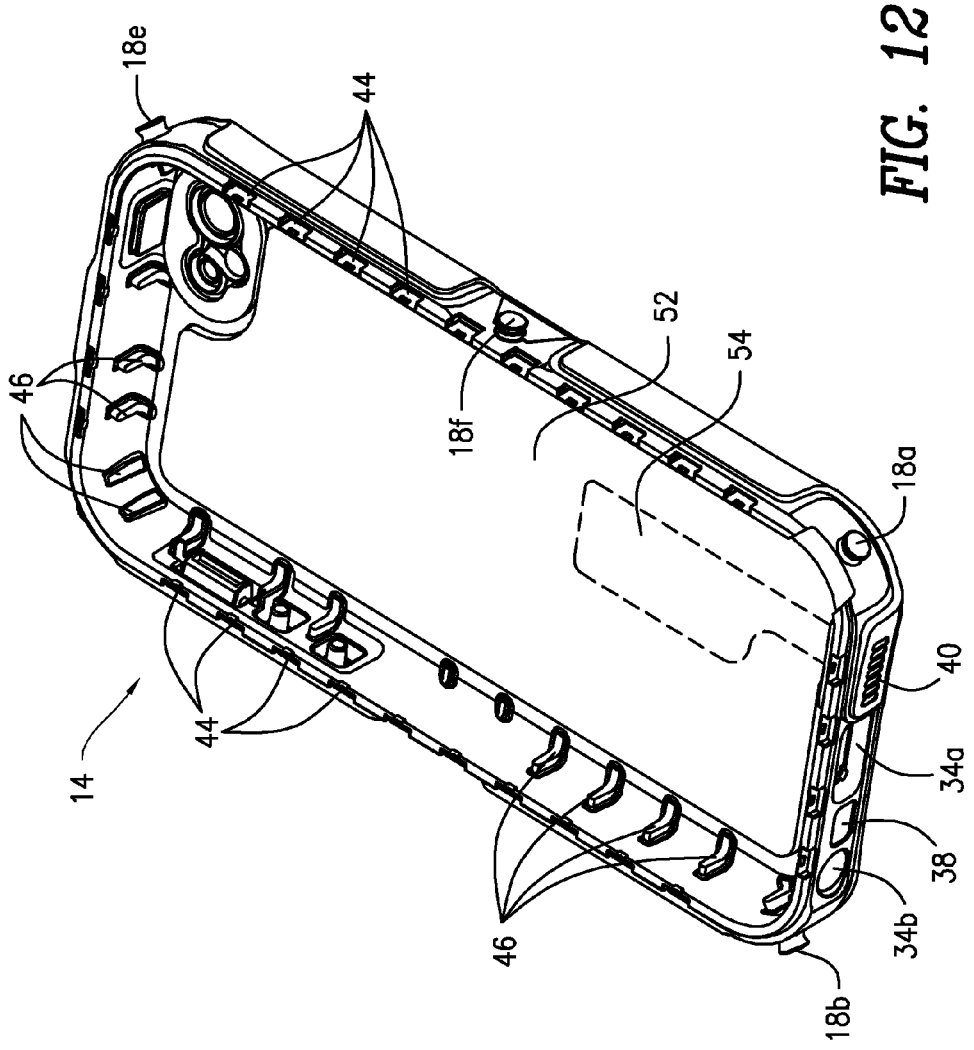
FIG. 12 is a front perspective view of the base shown in FIG. 11.

Now referring to FIGS. 11 and 12, a front view and a front perspective view of the base 14 are shown, respectively. The base 14 is sized to receive the mobile electronic device. The base 14 defines a planar portion and sidewall portions. The base 14 includes a flexible sheet 52 disposed on the planar portion of the base 12. The flexible sheet 52 is configured to space the mobile electronic device from the planar portion of the base 14. The flexible sheet 52 is resiliently compressible and may be an open-cell foam, a closed-cell foam, TPU or any combination thereof, for example. According to some exemplary embodiments, the flexible sheet 52 defines a resonator 54. When the mobile electronic device is retained in the case 10, the resonator 54 includes a cavity defined by the base 14, the flexible sheet 52 and the mobile electronic device that is configured as an acoustic resonator that amplifies and/or resonates sound emitted from a speaker of the mobile electronic device when the mobile electronic device is retained within the case 10. The resonator 54 may be sized or tuned to resonate the sound in a predetermined range of frequencies in the range of human hearing between 20 Hz to 20,000 Hz or in the range of human voice speech between 300 Hz to 3,400 Hz, for example. According to some exemplary embodiments, the resonator 54 may cause or induce an exposed portion of the base 14 to vibrate and amplify the sound from the mobile electronic device speaker and through the speaker port 40 and/or through the base 14 itself.

Figure 13:
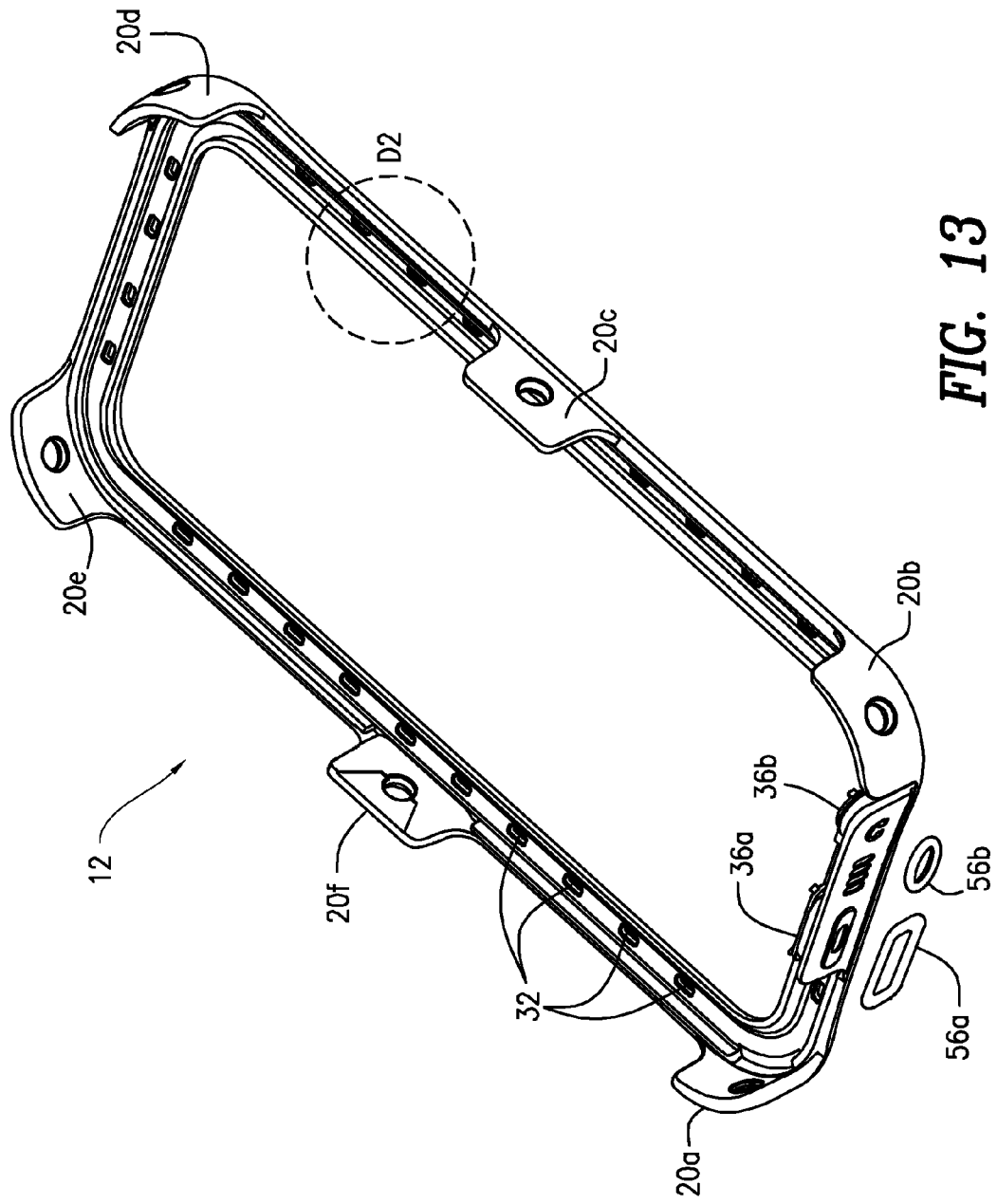
FIG. 13 is a rear perspective view of the cover shown in FIG. 6.

Now referring to FIG. 13, a rear perspective view of the cover 12 is shown. Each of the port plugs 36 include a corresponding port plug gasket 56a and 56b, collectively referred to as port plug gaskets 56. According to some exemplary embodiments, each of the second securing elements 20 defines an opening that is configured to receive the protuberance of the corresponding first securing element 18. The opening of the second securing elements 20 may retain the protuberance of the first securing elements 18 by a friction fit or an interference fit, for example.

Figure 14:
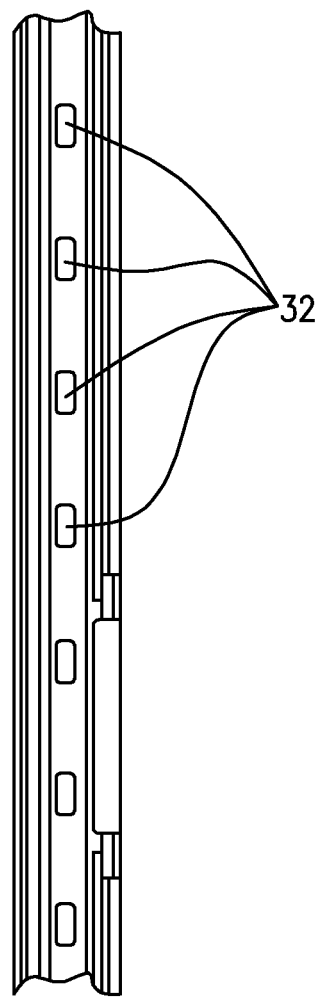
FIG. 14 is a rear detail view of section D2 of the cover shown in FIG. 13.

FIG. 14 is a rear detail view of section D2 of the cover 12 of FIG. 13. Each of the plurality of notches 32 is configured to receive a corresponding one of a plurality of retaining elements 42 of the screen protector 16 when the cover 12 is assembled to the base 14 and retains the screen protector 16 therebetween. Thus, when the cover 12 is assembled to the screen protector 16, the retaining elements 42 and the notches 32 form a male-female coupled pair. When the plurality of notches 32 receive the plurality of retaining elements 42, the lateral deformation of the cover 12 is reduced, thereby reducing a likelihood that one of the second securing elements 20 is inadvertently released from the first securing elements 18, and ensuring that a waterproof integrity of the case 10 is maintained.

Figure 15:
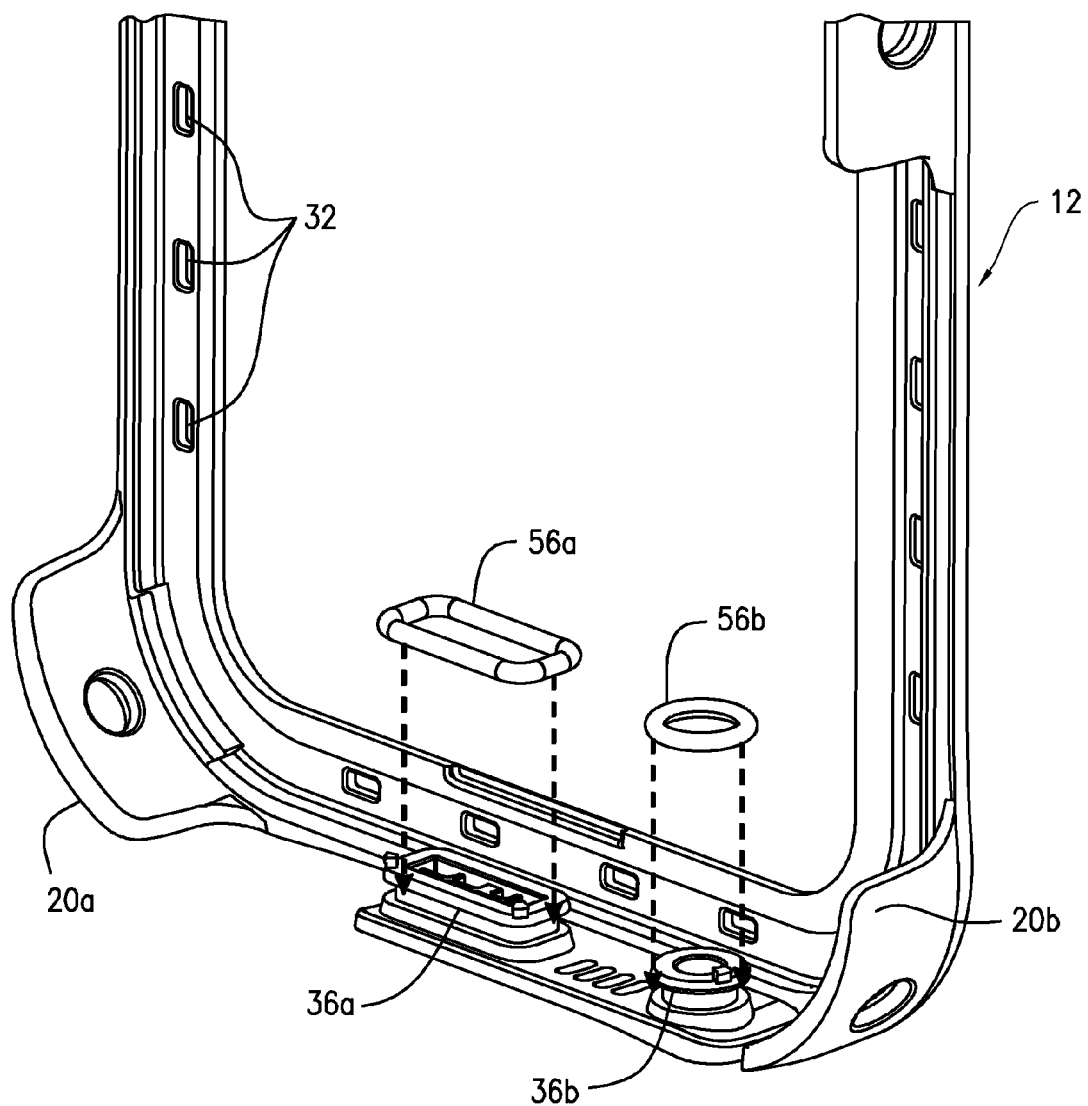
FIG. 15 is an exploded rear perspective view of plug gaskets and a portion of the cover shown in FIG. 13.

Now referring to FIG. 15, an exploded rear perspective view of port plug gaskets 56 and a portion of the cover 12 is shown. The port plugs 36 may be sized to compress or provide a clamping force to a corresponding port plug gasket 56, when the port plugs are inserted in the ports 34 of the base 14, to form a water proof seal between the ports 34 and the port plugs 36. The port plug gaskets 56 may be elastic and configured as a continuous loop and disposed on a corresponding perimeter defined by each port plug 36.

Figure 16:
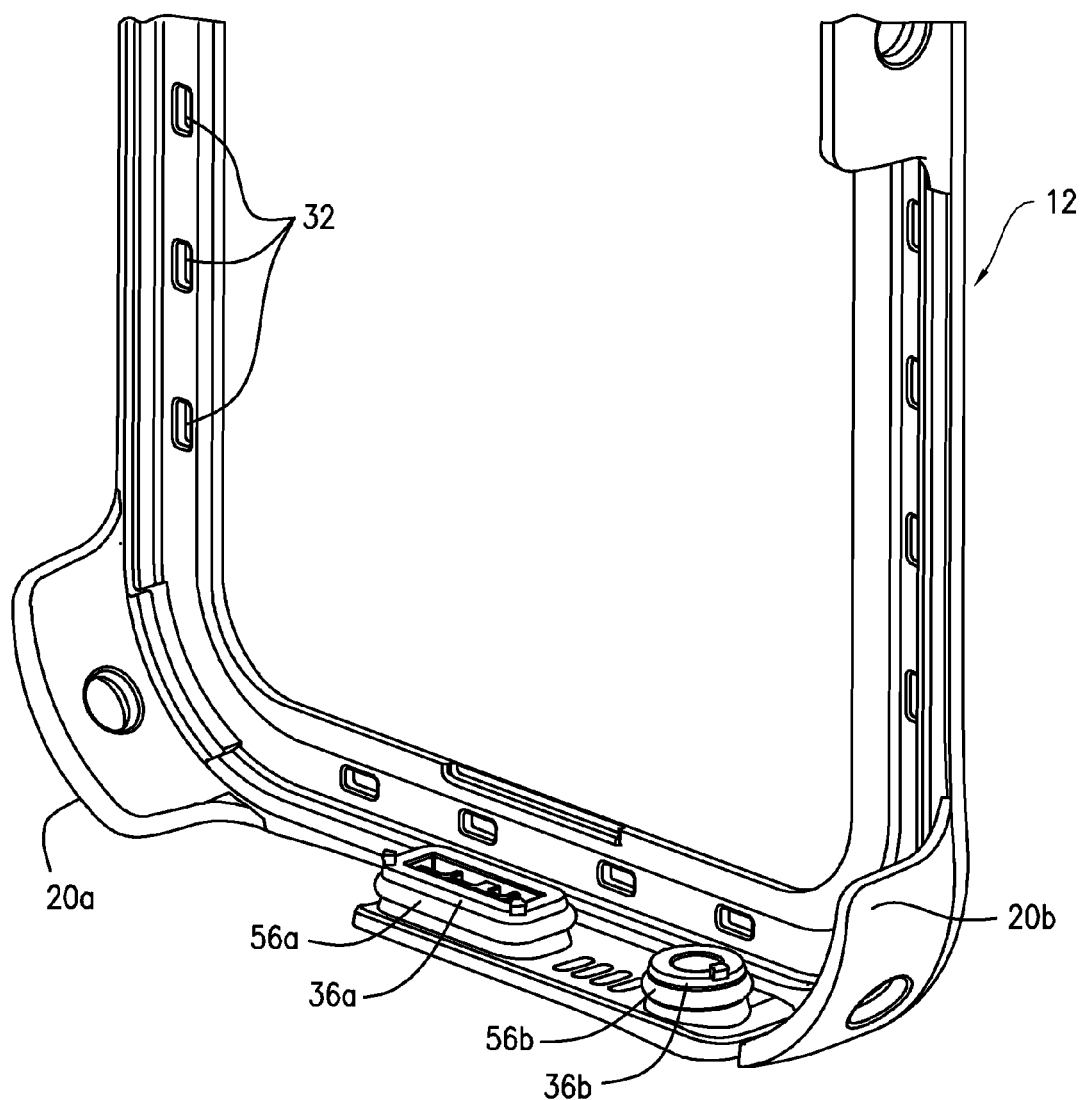
FIG. 16 is a rear perspective view of the portion of the cover shown in FIG. 15.

Now referring to FIG. 16, a rear perspective view of a portion of the cover 12 is shown with the port plug gaskets 56 assembled to the port plugs 36. The port plugs 36a and 36b and their corresponding port plug gaskets 56a and 56b are shown as having rectangular and circular shapes, respectively. According to some exemplary embodiments, the port plugs may be trapezoidal, oval or irregularly shaped.

Figure 17:
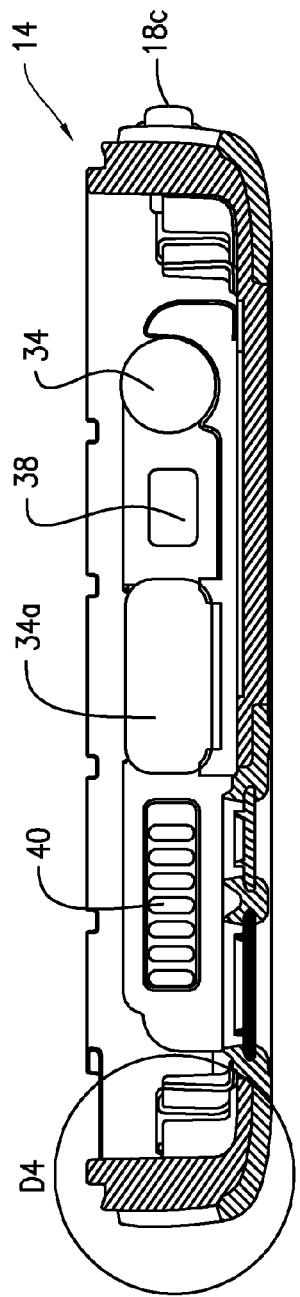
FIG. 17 is a view through section A-A of the base as shown in FIG. 11.

Now referring to FIG. 17, a view through section A-A of the base 14 of FIG. 11 is shown. The ports 34, acoustic port 38 and speaker port 40 are shown in the sidewalls defined by the base 14.

Figure 19:
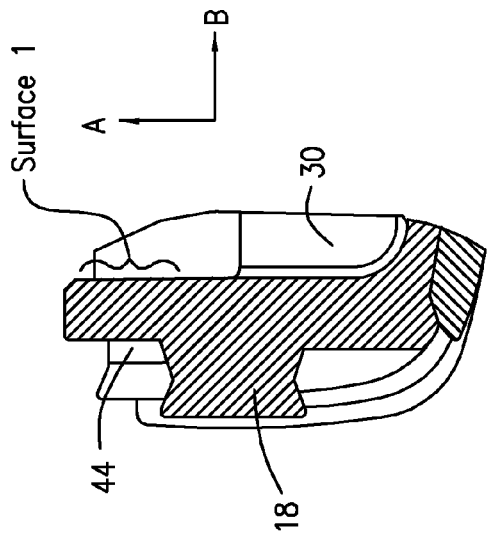
FIG. 19 is a detail view of section D4 in FIG. 17.
Figure 18:
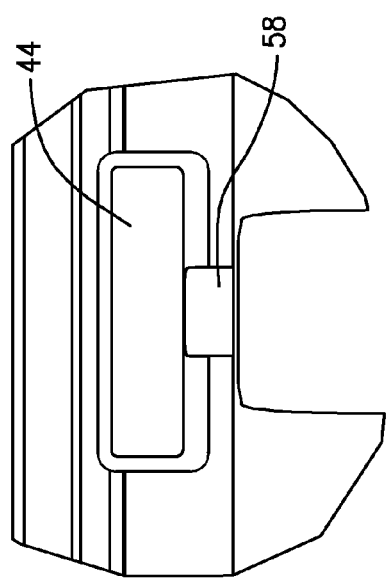
FIG. 18 is a top view through section D3 of the base shown in FIG. 11.

Now referring to FIGS. 18 and 19, respective detail view D3 and detail view D4 are shown of the receiving element 44 of the base 14. The base 14 defines the receiving element 44 as a substantially rectangular opening that extends for a distance into a perimeter of the base 14. The receiving element 44 may extend for the distance along an axis A that is substantially perpendicular to an axis B that is substantially parallel to the planar portion of the base 14. The receiving element 42 may include a guide notch 58 that extends from the receiving element 44 toward the interior of the base 14 and provides for flexion or movement of the base 14 to provide impact absorption for the base 14. The perimeter of the base 14 defines a gasket surface 1 on the interior of the base 14 that receives the gasket 48 when the screen protector 16 is assembled to the base 14.

Now referring to FIG. 20, a view through section B-B of the screen protector 16 of FIG. 10 is shown. The mating element 28 is shown on side B of the screen protector 16 and opposite the retaining element 42 on side A of screen protector 16.

Now referring to FIG. 21, a detail view of section D5 in FIG. 20 is shown. The rib 30 of the screen protector 16 may protrude away from the screen protector 16, initially extending perpendicular to a planar portion of the screen protector 16 and then outward away from the medial portion of the screen protector 16 parallel to the planar portion of the screen protector 16, thereby defining the groove 50. The screen protector 16 defines a gasket surface 2 on the perimeter of the screen protector 16 that receives the gasket 48 when the gasket 48 is assembled in the groove 50. According to some exemplary embodiments, the plurality of mating elements 28 protrude along an axis C that is substantially perpendicular to the planar portion of the screen protector 16 and the axis D, which is substantially parallel to the planar portion of the screen protector 16. The retaining element 42 is on the side A of the screen protector 16 opposite the rib 30 and the mating elements 28, which are on side B of the screen protector 16.

Thus, embodiments of the present invention provide a robust case for a mobile device that not only provides impact protection but also remains waterproof during and after such impacts. The retaining elements 42 of the screen protector 16 advantageously couple to the notches 32 of the cover 12 when the cover is assembled to the base 14 with the screen protector therebetween. The cooperation of the retaining elements 42 and the notches 32 advantageously allows the second securing elements 20 of the cover 12 to remain securely attached to the first securing elements 18 of the base 14. The mating elements 28 and the receiving elements 44 further cooperate to advantageously provide a waterproof seal between the gasket surface of the screen protector and the gasket surface of the base 14 by applying a clamping force to compress the gasket 48 between the respective gasket surfaces. In this way, the cover 12, the screen protector 16 and the base 14 cooperate to provide a protective and waterproof mobile device case.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. A case for a mobile communication device, the case comprising:
   a base defining an interior, the base defining a first surface and being configured to receive at least a portion of the mobile communication device in the interior, the base including:
      sidewalls defining a perimeter of the base and a first surface of the base; and
      a plurality of first mating elements, each of the plurality of mating elements being disposed on the perimeter;
   a screen protector configured to releasably engage the base, the screen protector defining a first surface of the screen protector, the screen protector including a plurality of second mating elements, at least one of the plurality of second mating elements being configured to releasably connect to a corresponding at least one of the plurality of first mating elements;
   a gasket releasably engageable to the screen protector, the screen protector configured to retain the gasket between the first surface of the base and the first surface of the screen protector; and
   a cover releasably engageable with the base, the cover being configured to releasably restrain the screen protector when engaged with the base, the cover defining an opening through which at least a portion of the screen protector is accessible.

2. The case according to claim 1, wherein:
   the base includes a plurality of first securing elements; and
   the cover includes a plurality of second securing elements, at least one of the plurality of second securing elements being configured to releasably engage a corresponding at least one of the plurality of first securing elements.

3. The case according to claim 1, wherein:
   the base includes a plurality of tension elements disposed in the interior, the plurality of tension elements being resiliently deformable; and
   each of the plurality of tension elements is configured to space the mobile communication device at least a distance from the sidewalls.

4. The case according to claim 3, wherein each of the plurality of tension elements is disposed on at least one of the base and one of the sidewalls.

5. The case according to claim 1, wherein:
   the base includes a side, each of the plurality of first mating elements comprising a slotted opening configured to extend a first distance into the side of the base; and
   the screen protector including a side, each of the plurality of second mating elements comprising a protuberance extending a second distance away from the side of the screen protector.

6. The case according to claim 5, wherein:
   the at least one of the plurality of second mating elements is configured to engage the corresponding at least one of the plurality of first mating elements over a distance with an increasing amount of force;
   the screen protector includes a rib disposed on the first surface of the screen protector, the rib having an outside surface; and
   a force of compression of the gasket between the at least the portion of the inside surface of the perimeter of the interior and the at least the portion of the outside surface of the rib is based on the distance of engagement between the at least one of the plurality of second mating elements and the corresponding at least one of the plurality of first mating elements.

7. The case according to claim 6, wherein each of the plurality of second mating elements is partially tapered.

8. A case for a mobile communication device, the case comprising:
   a base defining an interior, the base defining a first surface and being configured to receive at least a portion of the mobile communication device in the interior;
   a screen protector configured to releasably engage the base, the screen protector defining a first surface of the screen protector;
   a gasket releasably engageable to the screen protector, the screen protector configured to retain the gasket between the first surface of the base and the first surface of the screen protector; and
   a cover releasably engageable with the base, the cover being configured to releasably restrain the screen protector when engaged with the base, the cover defining an opening through which at least a portion of the screen protector is accessible;
   the screen protector includes a rib, the rib being disposed on the first surface of the screen protector, the rib defining at least a portion of a perimeter of the screen protector and having an outside surface;
   the base includes sidewalls defining a perimeter of the base and a first surface of the base and an inside surface of the perimeter; and
   the gasket is disposed between at least a portion of the inside surface of the perimeter of the interior and at least a portion of the outside surface of the rib disposed on the screen protector when the screen protector is restrained in the engaged configuration with the base.

9. The case according to claim 8, wherein the gasket is resiliently deformable and configured to form an at least substantially watertight seal between the base and the screen protector.

10. The case according to claim 8, wherein the rib defines a groove configured to retain the gasket on the perimeter of the screen protector.

11. The case according to claim 1, wherein:
   the sidewalls define an accessory port; and
   the cover includes an accessory plug, the accessory plug configured to be releasably inserted into the accessory port, the case further comprising:
   an accessory plug gasket disposed on the accessory plug, wherein the accessory plug gasket is configured to form an at least substantially watertight seal between the accessory plug and the accessory port when the accessory plug is inserted into the accessory port.

12. The case according to claim 1, wherein the cover defines a plurality of notches on a first surface of the cover, the case further comprising:
   a plurality of tabs disposed on a second surface of the screen protector, the second surface being on a side of the screen protector that is opposite the first surface of the screen protector, at least one of the plurality of tabs being configured to engage a corresponding at least one of the plurality of notches when the case is in the engaged configuration.

13. A case for a mobile communication device, the case comprising:
- a base defining an interior, the base defining a first surface and being configured to receive at least a portion of the mobile communication device in the interior;
- a screen protector configured to releasably engage the base, the screen protector defining a first surface of the screen protector;
- a gasket releasably engageable to the screen protector, the screen protector configured to retain the gasket between the first surface of the base and the first surface of the screen protector;
- a cover releasably engageable with the base, the cover being configured to releasably restrain the screen protector when engaged with the base, the cover defining an opening through which at least a portion of the screen protector is accessible;
- the base includes sidewalls defining a perimeter of the base;
- the screen protector includes a rib, the rib being disposed on the first surface of the screen protector, the rib defining at least a portion of a perimeter of the screen protector, the rib having a length; and
- the rib includes a tension segment disposed on at least a portion of a length of the rib, the tension segment being resiliently deformable and configured to space the mobile communication device at least a distance from a portion of at least one of the side walls of the base, when the case is in the engaged configuration.

14. A case for a mobile communication device, the case comprising:
- a base defining an interior, the base defining a first surface and being configured to receive a portion of the mobile communication device in the interior, the base including sidewalls defining a perimeter of the base, the base including a plurality of first mating elements disposed on the perimeter of the base;
- a screen protector configured to releasably engage the base, the screen protector defining a first surface of the screen protector, the screen protector including a plurality of second mating elements, at least one of the plurality of second mating elements being configured to connect to a corresponding at least one of the plurality of first mating elements;
- a gasket releasably engageable to the screen protector, the screen protector configured to retain the gasket between the first surface of the base and the first surface of the screen protector;
- a cover releasably engageable with the base, the cover being configured to releasably restrain the screen protector when engaged with the base, the cover defining an opening through which at least a portion of the screen protector is accessible.

15. The case according to claim 14, wherein:
the perimeter of the base defines an inside surface; and
the first surface of the screen protector includes a rib, the rib defining at least a portion of a perimeter of the screen protector, the rib including an outside surface, the gasket being disposed between at least a portion of the inside surface of the perimeter of the interior and at least a portion of the outside surface of the rib disposed on the screen protector when engaged with the base.

16. The case according to claim 15, wherein the plurality of first mating elements and the plurality of second mating elements are configured to compress the gasket between the inside surface of the perimeter of the interior and at least a portion of the outside surface of the rib to form an at least substantially watertight seal therebetween.

17. The case according to claim 16, wherein:
the perimeter of the base defines a side;
each of the plurality of first mating elements define a slotted opening configured to extend a first distance into the side of the perimeter;
the screen protector including a side; and
each of the plurality of second mating elements include a protuberance extending a second distance from the side of the screen protector.

18. The case according to claim 16, wherein:
the at least one of the plurality of second mating elements is configured to engage the corresponding at least one of the plurality of first mating elements over a distance with an increasing amount of force;
a level of compression of the gasket between the at least the portion of the inside surface of the perimeter of the interior and the at least the portion of the outside surface of the rib is based on the distance of engagement between the at least one of the plurality of second mating elements and the corresponding at least one of the plurality of first mating elements; and
the plurality of first mating elements and the plurality of second mating elements are configured to vary compression of the gasket between the at least the portion of the inside surface of the perimeter of the interior and the at least the portion of the outside surface of the rib based on an extent of the distance.

19. A case for a mobile communication device, the case comprising:
- a base defining an interior, the base being configured to receive at least a portion of the mobile communication device in the interior, the base including sidewalls, the sidewalls defining a perimeter of the base and a first surface of the base, the perimeter having an outside portion, the base including a plurality of first mating elements disposed on the outside portion of the perimeter of the base, each of the plurality of first mating elements including a slotted opening configured to extend a first distance into a side of the side of the base;
- a screen protector configured to releasably engage the base, the screen protector defining a first surface of the screen protector, the screen protector including a plurality of second mating elements, at least one of the plurality of second mating elements being configured to connect to a corresponding at least one of the plurality of first mating elements over a distance, each of the plurality of second mating elements including a protuberance extending a second distance from a side of the screen protector, the screen protector including a rib disposed on the first surface, the rib defining at least a portion of a perimeter of the screen protector;
- a gasket releasably engageable to the screen protector, the screen protector configured to retain the gasket between the first surface of the base and the first surface of the screen protector, the rib being configured to retain the gasket on the perimeter of the screen protector;
- a cover releasably engageable with the base, the cover being configured to restrain the screen protector in an engaged configuration with the base, the gasket being disposed between at least a portion of an inside surface of the perimeter of the interior and at least a portion of an outside surface of the rib when the screen protector is retained in the engaged configuration with the base, a level of compression of the gasket between the at least the portion of the inside surface of the perimeter of the interior and the at least the portion of the outside surface of the rib being based on the extent of engagement between the at least one of the plurality of second mating elements and the corresponding at least one of the plurality of first mating elements.

\* \* \* \* \*